B. P. SAUNDERS & O. WILLIAMS.
APPARATUS FOR UNLOADING FREIGHT CARS.
APPLICATION FILED APR. 8, 1913.
1,088,100.
Patented Feb. 24, 1914.
2 SHEETS—SHEET 1.
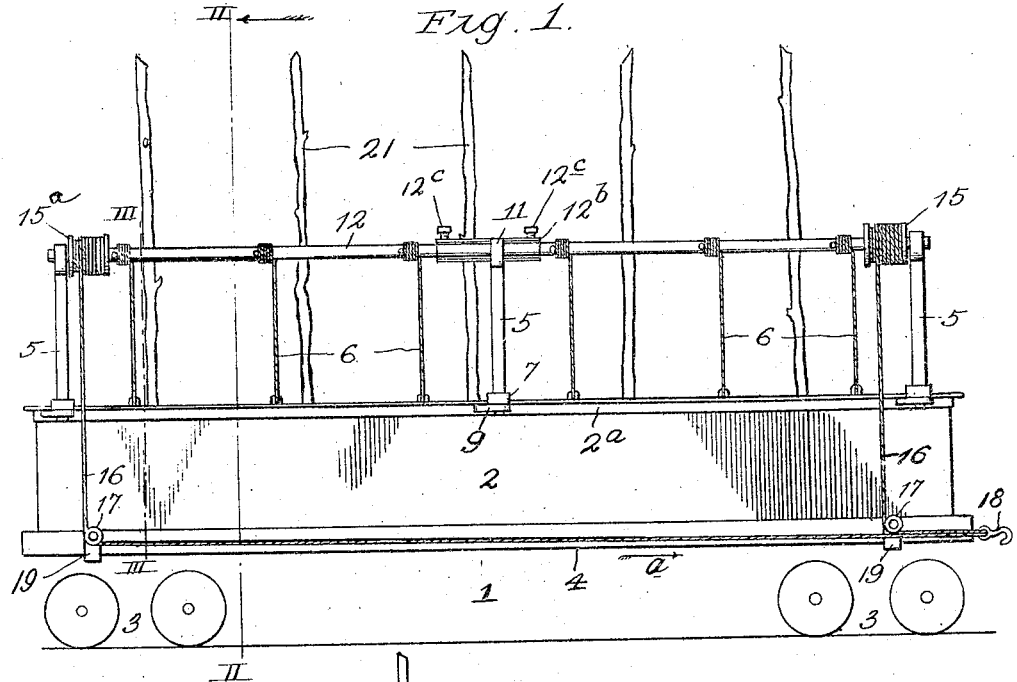
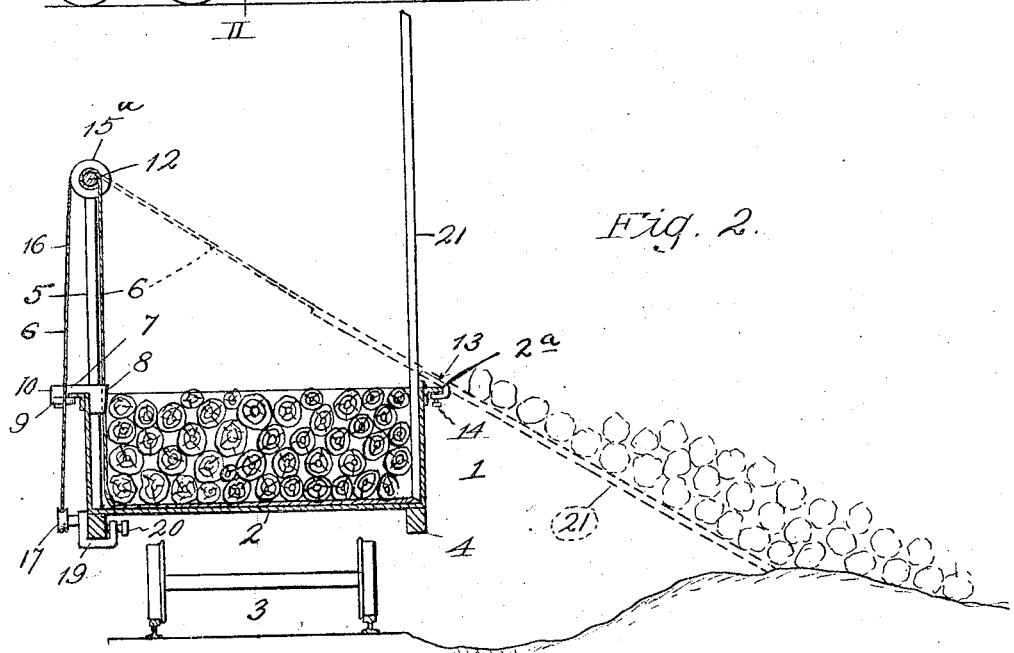
WITNESSES:
INVENTORS:
Benjamin P. Saunders,
and Oscar Williams,
BY
F. G. Fischer,
ATTORNEY.

B. P. SAUNDERS & O. WILLIAMS.
APPARATUS FOR UNLOADING FREIGHT CARS.
APPLICATION FILED APR. 8, 1913.

1,088,100.

Patented Feb. 24, 1914.

2 SHEETS—SHEET 2.

WITNESSES:
R. Hamilton
L. J. Fischer

INVENTORS.
Benjamin P. Saunders
and Oscar Williams,
BY
F. G. Fischer
ATTORNEY.

UNITED STATES PATENT OFFICE.

BENJAMIN P. SAUNDERS, OF IATAN, AND OSCAR WILLIAMS, OF WESTON, MISSOURI.

APPARATUS FOR UNLOADING FREIGHT-CARS.

1,088,100.   Specification of Letters Patent.   Patented Feb. 24, 1914.

Application filed April 8, 1913. Serial No. 759,604.

*To all whom it may concern:*

Be it known that we, BENJAMIN P. SAUNDERS and OSCAR WILLIAMS, citizens of the United States, residing at Iatan and Weston, respectively, in the county of Platte and State of Missouri, have invented certain new and useful Improvements in Apparatus for Unloading Freight-Cars, of which the following is a specification.

Our invention relates to improvements in apparatus for unloading freight cars, and our object is to provide novel means whereby poles, brush, etc., can be more quickly and economically unloaded than heretofore.

A further object is to provide an apparatus of this character, so arranged that it can be quickly secured to or removed from a freight car.

Figure 3:
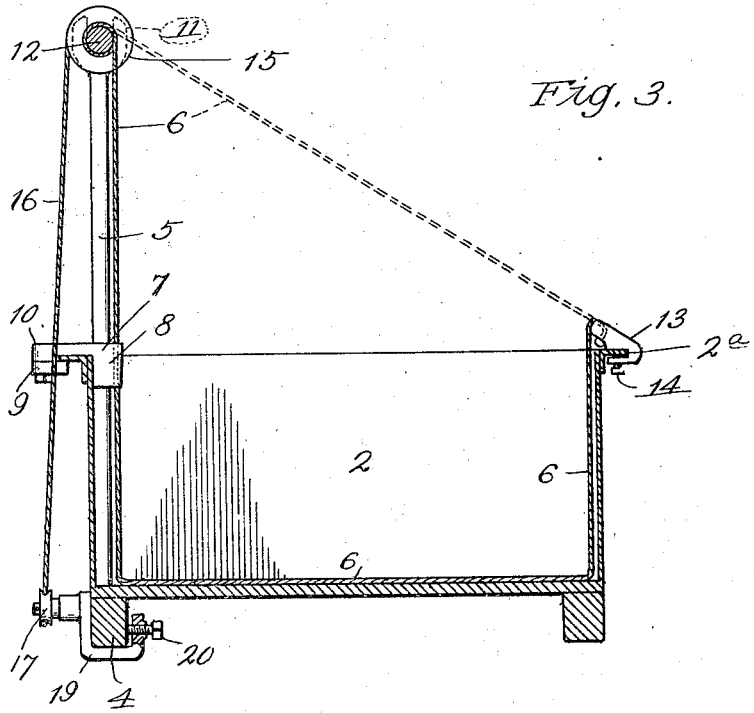
Figure 4:
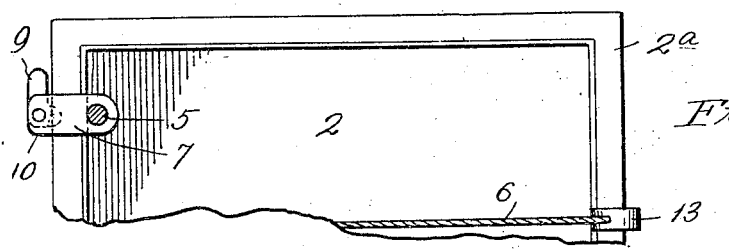
Figure 5:
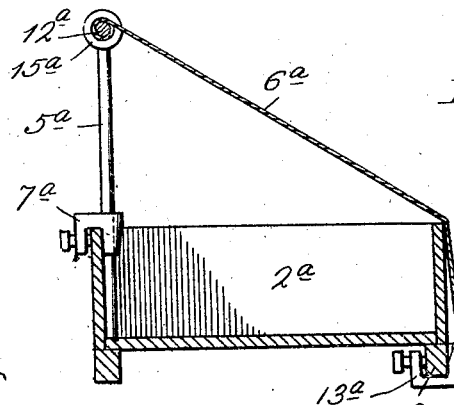

In order that the invention may be fully understood, reference will now be made to the accompanying drawings, in which:

Figure 1 is a side elevation of a steel freight car provided with our unloading apparatus. Fig. 2 is a vertical cross section of the apparatus on line II—II of Fig. 1, and showing the operation thereof by dotted lines. Fig. 3 is a cross section of the apparatus on line II—II of Fig. 1, and showing the operation thereof by dotted lines. Fig. 4 is a broken plan view of one end of the freight car with a portion of the apparatus in position thereon. Fig. 5 is a cross section of a modified form of apparatus applied to a wooden freight car.

1 designates a steel freight car of the ordinary gondola type, embodying a body portion 2, trucks 3, and sills 4 to reinforce the body portion 2.

In carrying out our invention, we employ a plurality of standards 5 which extend above the sides of the car body 2, to give sufficient pitch to the unloading cables 6 (see dotted lines, Figs. 2 and 3), to discharge a load from said car body 2. Standards 5 rest upon the floor of the car body 2 and are firmly secured against one side thereof by clamping members 7, each consisting of a sleeve 8, engaging the inner surface of the car body and a cam lever 9, said cam lever being pivotally-connected to a lug 10 resting upon the upper edge of the car body and formed integral with sleeve 8 through which a standard extends. Standards 5 are bifurcated at their upper terminals 11, in which is removably mounted a shaft 12 upon which the upper ends of the unloading cables 6 are wound, the lower terminals of said cables being attached to hook members 13 adapted to be removably-secured to the opposite side of the car body 2. Each hook member 13 is provided with a set-screw 14 adapted to engage the underside of the angle-bar 2ª, extending around the upper margin of the car body 2. Shaft 12 is provided near its ends with two fixedly-mounted hoisting drums 15, upon which the upper ends of a pair of hoisting cables 16 are wound, said hoisting cables extending around guide pulleys 17 and toward one end of the car where they are attached to a hook 18. Shaft 12 is in two pieces adjustably connected by a sleeve 12ᵇ and set-screws 12ᶜ. Each guide pulley 17 is journaled on a bracket 19, which hooks under the adjacent sill 4 of the car body 2 and is provided with a set screw 20 whereby it is firmly secured to said sill.

In practice, when the car is to be loaded with logs, brush, poles, or the like, the hoisting cables 6 are slackened sufficiently to lie against the interior portion of the sides and floor of the car body 2 and the load is placed upon said hoisting cables as shown on Fig. 2. Motive power in the form of a team or an engine is then attached to hook 18 which is drawn forwardly in the direction of arrow *a* Fig. 1. This operation unwinds the hoisting cables from the drums 15, which are rotated thereby and in turn rotate the shaft 12 which winds the unloading cables 6 thereon until the same assume the inclined position indicated by the dotted lines, Fig. 2, which is sufficient to discharge the load to one side of the car track. Should it be desired to discharge the load some little distance from the car track uprights 21 are placed against that side of the car body opposite the side to which the standards 5 are secured. As the load is raised the pressure thereof upsets the uprights to the inclined position causing them to act as skids in conducting the load clear of the track.

When desired, the apparatus can be readily removed from the car after loosening the clamping members 7, the hook members 13, and the brackets 19 from the car body.

In the modified form disclosed by Fig.

5, the construction of the apparatus is substantially the same as the preferred form, except that the clamping members and the hook members are adapted to fit the wooden body of a car instead of a steel body.

Referring in detail to said modified form, 2ª indicates the wooden car body which is reinforced by wooden sills 4ª.

5ª designates the standards which are secured to one side of the body 2ª by clamping members 7ª. Journaled in the upper portion of standards 5ª is a shaft 12ª provided with hoisting drums 15ª.

6ª designates unloading cables attached at their upper ends to shaft 12ª and their lower ends to hook members 13ª, adapted to be secured to the adjacent sill 4ª. It is deemed unnecessary to show the other parts of the apparatus on this figure as they are clearly shown on other figures of the drawings.

Having thus described our invention, what we claim and desire to secure by Letters Patent is:

1. In combination with a car body, standards resting against one side and the floor of said body, clamping members to removably secure said standards in position, a shaft mounted upon said standards, unloading means secured to said shaft and the opposite side of the car body, and means to rotate the shaft to wind said unloading means thereon until inclined sufficiently to discharge a load from the car body.

2. In combination with a car body, standards secured to one side of said body, a shaft mounted upon said standards, hook members secured to the opposite side of the car body, unloading means secured at one end to the shaft and at its opposite end to said hook members, and means to rotate the shaft to wind said unloading means thereon until inclined sufficiently to discharge a load from the car body.

3. In combination with a car body, standards secured to one side of said body, a shaft mounted upon said standards, unloading means secured to said shaft and the opposite side of the car body, hoisting drums mounted upon said shaft to rotate the same, cables to rotate said drums to wind the unloading means upon the shaft until inclined sufficiently to discharge a load from the car body, guide pulleys for said cables, and brackets secured to the car body and upon which said guide pulleys are mounted.

In testimony whereof we affix our signatures, in the presence of two witnesses.

BENJAMIN P. SAUNDERS.
OSCAR WILLIAMS.

Witnesses:
J. W. COATS,
AUGUST SCHNEIDER.